United States Patent Office 3,235,590
Patented Feb. 15, 1966

3,235,590
CATALYTICALLY ISOMERIZING MALEIC ACID TO FUMARIC ACID IN THE PRESENCE OF DODECYL ALCOHOL
John A. Husmann, 28 Prince St., Staten Island, N.Y., and Ellsworth T. McGowan, Beaumont, Tex. (Hotel de Navarre, Artix, Basses Pyrenees, France)
No Drawing. Filed Nov. 8, 1963, Ser. No. 322,525
1 Claim. (Cl. 260—537)

This invention relates to a new and improved process for the preparation of high purity fumaric acid. Specifically, this invention teaches a method of forming large crystals of fumaric acid while meeting color specifications.

In U.S. copending application, Serial No. 318,802, filed October 25, 1963, a method is proposed for producing large crystals of fumaric acid by the addition of dodecyl alcohol prior to the isomerization. This procedure, while quite satisfactorily producing large and strong crystals, results in the degradation of color quality, which, in many applications, is undesirable.

In accordance with this invention it has been found that color specifications can be restored by bubbling steam through the crystallizer upon the completion of the isomerization.

The amount of steam employed may best be expressed in weight per volume, i.e., pounds of steam per gallon of crystallizer slurry. At least 0.2 pound of steam per gallon of solution should be employed. The upper limit of the steam used is dependent on practical problems such as entrainment and condenser economies. Generally, 0.5 pound of steam per gallon of solution in the crystallizer may be considered the upper limit.

Broadly, the crystallizer slurry contains from trace amounts to 50% by weight of fumaric acid, preferably from 20 to 40 weight percent.

The temperature should be such that the solution is boiling. These temperatures range between 75 and 150° F., preferably 90 to 120° F., depending upon the pressure in the crystallizer. Crystallizer pressures are essentially equivalent to the vapor pressure of water, since the solution is boiling.

By performing the process in the manner described above, color specifications of less than APHA 20 can be readily met. Where the color of the product runs between APHA 15 and APHA 40 upon the addition of a wetting agent, the use of the steam stripping results in an excellent product having a color ranging from APHA 0 to APHA 7. Reference is made to the copending application referred to above for the appropriate amounts of dodecyl alcohol added during the isomerization. Briefly, sufficient material must be added to form a second phase.

The isomerization of maleic acid to fumaric acid is well known in the art as are the catalysts and reaction conditions which are applicable. Preferably, the isomerization catalyst employed is a combination of a bromine-containing compound and a strong oxidizing agent, e.g., ammonium bromide and ammonium persulfate. These types of catalysts are more fully defined in copending application 305,547, filed August 29, 1963. Though these catalysts are preferred, a wide variety of other isomerization catalysts have been described in the literature. These include thiazole, thiourea, thiazoline, thiuram disulfide, dithiocarbamates, mercaptans, alkyl disulfide, strong mineral acids, heavy metal salts, ammonia, pyridine, primary and secondary amine, iodine, hydrochloric acid, sulfuric acid, potassium, thiocyanate. The use of these catalysts is discussed in U.S. Patent 2,790,827, and in Kirk-Othmer Encyclopedia of Chemical Technology, Interscience 1952, volume 8, page 692.

*Example 1*

20,600 gallons of fumaric acid solution containing approximately 28 wt. percent of fumaric acid and 250 p.p.m. of dodecyl alcohol are passed through crystallizer at the rate of approximately 7 gallons per minute. No steam is bubbled through the crystallizer. Liquid hold up volume in the crystallizer is 800 gallons. The average color of the dried fumaric acid product is 20.6 on the APHA scale.

*Example 2*

13,000 gallons of fumaric acid having the approximate concentration of 28 wt. percent of fumaric acid in water is passed through a crystallizer at the rate of approximately 7 gallons per minute. The slurry again contains 250 p.p.m. of dodecyl alcohol. Stripping steam is bubbled through the crystallizer at an average rate of 0.3 lb. of steam per gallon of solution in the crystallizer. The volume of slurry in the crystallizer is 800 gallons. Average color of the resultant dried fumaric acid product is 6.0 on the APHA scale.

*Example 3*

Example 2 is repeated except 10,300 gallons of slurry are passed through the crystallizer. The steam rate is again 0.3 lb. of steam per gallon of solution and the average color of the dried fumaric acid product is 4.4 on the APHA scale.

*Example 4*

800 gallons of fumaric acid slurry containing approximately 30 wt. percent of fumaric acid in water and 250 r.p.m. of dodecyl alcohol are held up in the crystallizer for 10 hours and heat losses are prevented by circulating a small stream of the slurry through an external heater (at the approximate rate of 5 gallons per minute). Such hold up occurs when mechanical difficulties occur downsteam from the crystallizer. In this heater the slip stream is heated from 95° F. to 135° F. The crystallizer is maintained at the pressure corresponding to the vapor pressure of water at 95° F. Excess heat is removed in the crystallizer by fast evaporation. During this 10-hour period, the APHA color of the fumaric acid slurry increases from 10 APHA to 80 APHA.

*Example 5*

Example 4 is repeated except that approximately 250 lbs. per hour of steam are bubbled through the slurry. p.p.m. of dodecyl alcohol are held up in the crystallizer increases from 10 APHA to only 20 APHA.

It will be understood that modifications and variations may be effected without departing from the spirit of the invention.

We claim:

In a process for the preparation of fumaric acid by the catalytic isomerization of maleic acid wherein the fumaric acid is crystallized from a solution containing from 20 to 50% fumaric acid in the presence of dodecyl alcohol, the improvement of: bubbling through said fumaric acid solution at least 0.2 pound of steam per gallon of said solution after the completion of said isomerization, said solution being boiling during the said bubbling.

References Cited by the Examiner
UNITED STATES PATENTS

| | | | |
|---|---|---|---|
| 2,758,134 | 8/1956 | Dobratz | 260—537 |
| 2,790,827 | 4/1957 | Cummings et al. | 260—537 |
| 2,816,922 | 12/1957 | Stephenson | 260—537 |

LORRAINE A. WEINBERGER, *Primary Examiner.*
LEON ZITVER, *Examiner.*